No. 693,586. Patented Feb. 18, 1902.
A. B. BRYANT.
CARRIAGE GEAR.
(Application filed Mar. 28, 1901.)
(No Model.)
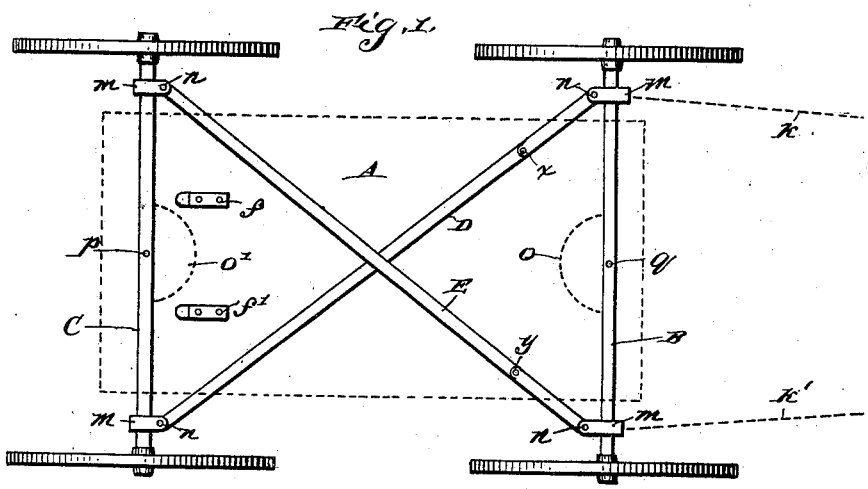
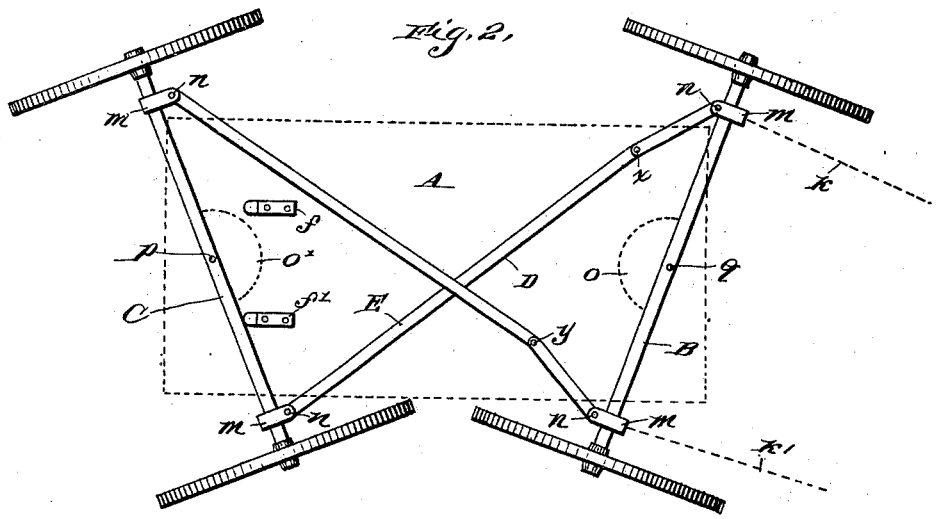
Witnesses:
O. M. VanWinckel.
Annie J. Tracy
Inventor:
Angelo B. Bryant
By his attorney
Frank King

UNITED STATES PATENT OFFICE.

ANZLO B. BRYANT, OF KINGSTON, CANADA.

CARRIAGE-GEAR.

SPECIFICATION forming part of Letters Patent No. 693,586, dated February 18, 1902.

Application filed March 28, 1901. Serial No. 53,259. (No model.)

*To all whom it may concern:*

Be it known that I, ANZLO B. BRYANT, butcher, a British subject, residing at the city of Kingston, in the county of Frontenac, in the Province of Ontario and Dominion of Canada, have invented a new and useful Improvement in Carriage-Gears, of which the following is a specification.

My invention consists in having the front and rear axles of a vehicle both arranged to move freely on pins at their centers, (instead of having only the front axle movable,) in providing bars or rods properly hinged or jointed connecting the axles together, so that when the front wheels are cramped in the act of turning the vehicle the rear wheels automatically assume a position in the opposite direction, and in providing a stop which may prevent the rear axle from turning more than a certain distance, the main objects gained being the following, viz: first, ability to turn the vehicle easily and quickly in a very small space and a corresponding decrease in the danger of upsetting during a sudden turn; second, a much greater separation of the wheels on one side of the vehicle when the front wheel is brought forward to allow a person to enter, and, third, the prevention of any friction between the tires and the side of the vehicle by reason of the stop provided to limit the motion of the axles, this being a necessary object in vehicles provided with pneumatic tires. I attain these objects by the device illustrated in the accompanying drawings, in which—

Figure 1 is a plan of a vehicle with the wheels tracking straight. Fig. 2 is a plan of the vehicle with the wheels in the turning position, and Fig. 3 is a plan of the stop provided to limit the motion of the axles.

Similar letters refer to similar parts throughout the several views.

The dotted outline A represents the body or box of the vehicle, and $k$ and $k'$ the shafts. B and C are the front and rear axles, the rear axle having a free turning motion on a pin or pivot at $p$ in the same manner as the front axle of the vehicle, which turns on a center $q$, and the necessary braces may also be provided for the rear axle, including the "half-circle" or "fifth-wheel" $o'$, such as would be used on the front axle at $o$. To both front and rear axles clamps or blocks $m$, $m$, $m$, and $m$ would be attached either by screw-bolts, as at present, or preferably, in the case where metal is entirely used, by welding or manufacturing them in one piece with the axle. To those on the front axle the shafts are attached with the necessary hinging motion, and at the points marked $n$ rods or bars E and D are attached by pins. These rods cross diagonally under the body of the vehicle, as shown, and are bent or slightly curved in a perpendicular plane, so as not to interfere or rattle at the point of crossing. They are provided with joints or hinges at $x$ and $y$, allowing them to buckle horizontally when necessary and when the vehicle is turned to either side.

It will be seen at once that when the vehicle is traveling straight the wheels will track straight and true, but that when turning at all to one side or the other the motion of the front axle will by reason of the connecting-rods E and D cause the rear axle and wheels to assume the relative position shown in the drawings, so that the vehicle will turn sharply in a circle the center of which would be the point of intersection of the axles if produced in imaginary lines. It will be quite apparent also that in this second position of the wheels a person will much more readily obtain access to the seat of the vehicle.

$f$ and $f'$ are brackets intended to be bolted, as shown, to the bottom of the vehicle or attached in a suitable position upon the braces supporting the axles. They will be so placed that the arm of the bracket (shown in Fig. 3) will limit the motion of the rear axle, and therefore of both axles, and will so prevent the tires of the wheels from touching the body of the vehicle when the wheels are cramped in turning.

I am aware that attempts have been made to provide "double-swinging" or "double-oscillating" gears capable of doing effective work without rattling or wearing of the parts; but I have not known any such attempts to be successful, while I believe my invention overcomes the difficulties that have been encountered. The metal blocks $m$, $m$, $m$, and $m$ cannot wear or shake loose if made, as in my invention, by welding or otherwise in one integral piece with the metal axle instead of being bolted on by means of clip-ties. The curved or bent shape of the cross-rods E and D in my invention prevents their touching at the point of crossing and obviates the necessity for any cushioned guides at that point, which have always been found to fail in their purpose, while perhaps most important is the combination with these devices in my invention of brackets $f$ and $f'$, which will be out of the way when placed in position near the rear axle and which will most effectually prevent the tires of both front and rear wheels from touching the body of the vehicle, this being an advantage of great importance in any case and almost a necessity in vehicles where rubber or pneumatic tires are used.

What I claim as my invention, and desire to protect by Letters Patent, is—

1. In a double-swinging carriage or vehicle gear having both front and rear axles movable, bars or rods connecting the ends of the front axle with the diagonally opposite ends of the rear axle, so bent or curved as to cross each other without contact and provided with links or buckles to take up surplus strain, in combination with blocks upon the axles made, by welding or otherwise, in one integral piece therewith, and adapted for attachment of both bars and shafts, and with brackets or stops attached to the vehicle or frame so as to limit the swinging motion of the axles and prevent all contact of either front or rear wheel tires with the vehicle, all substantially as and for the purposes described.

2. In a carriage-gear, a bracket or stop attached so as to limit the swinging motion of the axles and prevent any contact between the tires of the wheels and the body or frame of the vehicle, substantially as shown.

In testimony whereof I have signed my name to this specification in the presence of two subscribing witnesses.

ANZLO B. BRYANT.

Witnesses:
CLARE CORRIGAN,
BERTHA M. VAN WINCKEL.